United States Patent
Garcia-Martinez et al.

(10) Patent No.: US 9,317,869 B2
(45) Date of Patent: Apr. 19, 2016

(54) IDENTIFYING CONSUMER SEGMENTS USING A SOCIAL NETWORKING SYSTEM

(75) Inventors: Antonio Felipe Garcia-Martinez, Alameda, CA (US); Nipun Mathur, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 325 days.

(21) Appl. No.: 13/553,488

(22) Filed: Jul. 19, 2012

(65) Prior Publication Data

US 2014/0025735 A1 Jan. 23, 2014

(51) Int. Cl.
  *G06Q 30/02* (2012.01)
  *G06Q 50/00* (2012.01)

(52) U.S. Cl.
  CPC .......... *G06Q 30/0251* (2013.01); *G06Q 30/02* (2013.01); *G06Q 50/01* (2013.01)

(58) Field of Classification Search
  None
  See application file for complete search history.

(56) References Cited

U.S. PATENT DOCUMENTS

| | | | |
|---|---|---|---|
| 8,122,020 B1 * | 2/2012 | Donsbach et al. | 707/732 |
| 8,667,009 B2 * | 3/2014 | Voigt et al. | 707/769 |
| 2003/0083961 A1 * | 5/2003 | Bezos | G06Q 30/02 705/26.8 |
| 2003/0200156 A1 * | 10/2003 | Roseman | G06Q 30/02 705/26.44 |
| 2005/0198201 A1 * | 9/2005 | Bohn | H04L 12/6418 709/218 |
| 2009/0076887 A1 * | 3/2009 | Spivack et al. | 705/10 |
| 2009/0222348 A1 * | 9/2009 | Ransom et al. | 705/14 |
| 2009/0222551 A1 * | 9/2009 | Neely | G06Q 30/02 709/224 |
| 2009/0222720 A1 * | 9/2009 | Drieschner | 715/234 |
| 2009/0235149 A1 * | 9/2009 | Frohwein | 715/205 |
| 2009/0261157 A1 * | 10/2009 | Kumar | G06Q 30/02 235/375 |
| 2009/0319449 A1 * | 12/2009 | Gamon et al. | 706/12 |
| 2010/0023874 A1 * | 1/2010 | Frohwein | G06F 3/048 715/747 |
| 2010/0114783 A1 * | 5/2010 | Spolar | 705/80 |
| 2010/0228617 A1 * | 9/2010 | Ransom et al. | 705/14.25 |
| 2010/0250557 A1 * | 9/2010 | Moon et al. | 707/749 |
| 2011/0093361 A1 * | 4/2011 | Morales | G06Q 10/087 705/26.62 |
| 2011/0125611 A1 * | 5/2011 | Perron | G06Q 30/02 705/27.1 |
| 2011/0137950 A1 * | 6/2011 | Deng | G06Q 30/02 707/794 |
| 2011/0143811 A1 * | 6/2011 | Rodriguez | 455/556.1 |
| 2011/0212717 A1 * | 9/2011 | Rhoads et al. | 455/420 |
| 2011/0314502 A1 * | 12/2011 | Levy et al. | 725/46 |
| 2012/0117059 A1 * | 5/2012 | Bailey et al. | 707/723 |
| 2012/0158935 A1 * | 6/2012 | Kishimoto et al. | 709/223 |
| 2012/0166935 A1 * | 6/2012 | Abhyanker | 715/234 |
| 2012/0185486 A1 * | 7/2012 | Voigt et al. | 707/741 |
| 2012/0271860 A1 * | 10/2012 | Graham et al. | 707/798 |

OTHER PUBLICATIONS

Hubspot, "Facebook Page Marketing 2011"—Facebook Page Marketing with p. 2 of 34 Jason Keath, Ellie Mirman, Justin Kistner and Justin Levy, 2011, all.*

* cited by examiner

*Primary Examiner* — Ninos Donabed
(74) *Attorney, Agent, or Firm* — Fenwick & West LLP

(57) ABSTRACT

Content posted to a brand page is associated with one or more tags defined by an entity associated with the brand page. Tags associated with content with which the user interacts are identified. As users of a social networking system interact with the content, the tags allow identification of user interests based on interaction with content items. Interactions with the tagged content allow the entity to use the tags to infer content in which different users have an interest. Because the tags are defined by the entity, distribution lists of users interested in content, such as content associated with business segments, may be created by the entity. The entity may also correlate user interests to aspects of user profiles, thereby developing an understanding of its consumers.

19 Claims, 3 Drawing Sheets

IDENTIFYING CONSUMER SEGMENTS USING A SOCIAL NETWORKING SYSTEM

BACKGROUND

Embodiments of the present disclosure relate generally to social networking and, more specifically, to targeted distribution of content items to users of a social networking system.

Social networks, or social utilities that track and enable connections between users (including people, businesses, and other entities), have become prevalent in recent years. In particular, a social networking system allows users to more efficiently communicate information that is relevant to their friends or other connections in the social network. Social networks typically incorporate a system for maintaining connections among users in the social network and links to content that are likely to be relevant to the users. Social networks also collect and maintain information about the users of the social network. This information may be static, such as geographic location, employer, job type, age, music preferences, interests, and a variety of other attributes, or it may be dynamic, such as tracking a user's actions within the social network. This information can then be used to target information delivery so that information more likely to be of particular interest to a user can be communicated to that user.

While social networking systems allow people to exchange information with each other, they also allow entities to provide information to users of the social networking system. Examples of entities include businesses, organizations and celebrities. An entity may create a brand page, which is associated with a profile, within the social networking system and post content items to the brand page. The social networking system then communicates the posted content item or a description of the posted content item to social networking system users connected to the brand page. Hence, the brand page allows the entity to act as any other user of the social networking system and disseminate information to social networking system users.

However, various types of entities have audiences composed of segments, wherein each segment has a particular interest in the entity. In the social networking context, different social networking system users may have different levels of interest in different content posted to the brand page. For example, users connected to a brand page associated with a sporting goods supplier have varying degrees of interest in posts on the brand page about products for different sports. Conventionally, users connected to a brand page are notified of content posted to the brand page without accounting for differing levels of interest in different content posted to the brand page.

SUMMARY

To improve interactions between a social networking system user and a brand page that is associated with an entity and stored on the social networking system, tags are generated by the entity and associated with content posted to the brand page. The tags may identify the subject matter of posted content, a product referenced by posted content, a keyword associated with the posted content or a feature of a product referenced by the posted content. Content posted to the brand page, or "posted content," is presented to social networking system users that are connected to the brand page. For example, a description of the content is included in a news feed of a social networking system users connected to the brand page. Interactions with the content by the social networking system users are received and used to generate groups of social networking system users based on tags associated with the content. A tag associated with content with which social networking system users have interacted is used to generate a group of users having interacted content associated with the tag. Hence, a group of users includes users who have interacted with content associated with a particular tag or with tags related to each other by the entity. This allows identification of segments of users based on the tags associated with content.

Grouping users based in part on their interaction with content associated with a tag allows tailoring of additional content to different groups of users. Additional content associated with, or related to, a tag may be identified and presented to a user, or to a group of users, previously interacting with content associated with the tag. For example, a tag is associated with various content having similar subject matter, so selection of content associated with the tag allows content presented to a user to have similar subject matter to content from a brand page with which the user previously interacted. This allows a user's interaction with a brand page to be customized based on prior user interactions between the user and brand page content, which may increase subsequent user interaction with the brand page. Additionally, tagging brand page content allows an entity associated with the brand page to obtain more detailed information about interactions with content from the brand page. An entity associated with a brand page may use custom-defined tags to customize classification of users interacting with content on the brand page. For example, a sports brand may tag content posted to its brand page with the tag "golf" and tag additional content posted to its brand page with the tag "football." Users interacting with either content are then associated with the tag associated with the content with which they interacted. Associating a user with a tag allows the sports brand to customize the content presented to the user based on the tag associated with the user or to target advertisements to the use based on the tag associated with the user. Additionally, because the entity defines the tags it associates with content, the tags are used in the context of the content posted by the entity. This allows the entity to obtain more relevant information about a user's interaction with content specific to the entity's use of the content, rather than generalized attributes or interests of the user.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system allows its users to communicate and interact with each other. Users join the social networking system and add connections to other users to whom they desire to be connected. This allows individuals joining the social networking system to form connections with and exchange information with other individuals. Entities providing goods and/or services may also join the social networking system and form connections to other users. For example, a manufacturer of goods, a service provider, a retailer or another business may join the social networking system, allowing other users to become connected to the manufacturer, service provider, retailer, business or other entity.

An entity may generate and maintain a brand page on the social networking system, where the entity posts information about itself, about its products or provides other information to users of the social networking system. The users may connect to the brand page to receive updates about information posted to the brand page or to receive information from the brand page. This allows an entity to provide information about itself or its products and/or services to social networking system users to form a stronger relationship between users and the entity or to increase interest in the entity by social networking system users.

However, users connected to a brand page may have varying degrees of knowledge about the entity corresponding to the brand page or about products or services offered by the entity. Similarly, users connected to a brand page may have differing levels of interest in different products or services offered by the brand page. For example, users connected to a brand page for a sporting equipment supplier may be interested in information on the brand page about tennis equipment offered by entity while being uninterested in information on the brand page about golf equipment.

Figure 1:
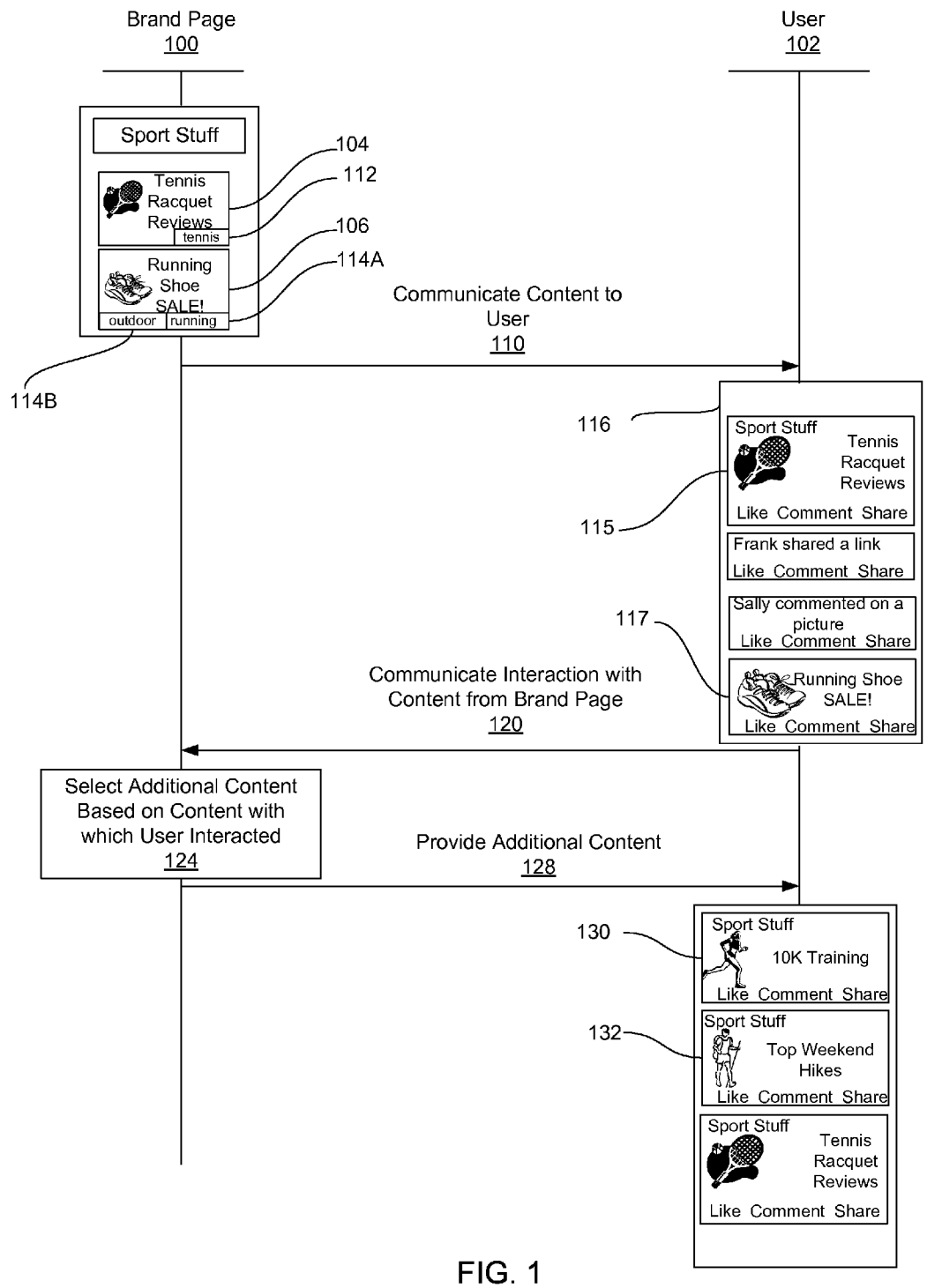
FIG. 1 is an interaction diagram illustrating customization of content presented to a social networking system a user based on the user's interaction with previously received content, in accordance with an embodiment of the invention.

FIG. 1 illustrates distribution of content posted to a brand page 100 by an entity to a social networking system user 102. As shown in FIG. 1, the entity posts content items 104, 106 to the brand page 100 and associates one or more tags 112, 114 with the content items. In the example of FIG. 1, a first content item 104 posted to the brand page is associated with a tag 112 identifying "tennis" and a second content item 106 is associated with tags 114A, 114B identifying "outdoor" and "running." The entity may define the tags 112, 114 in a variety of ways. For example, a tag may identify the subject matter described by a content item, a keyword associated with a content item, a user characteristic associated with a content item, a marketing campaign associated with a content item or any other suitable entity-defined criteria.

The content items 104, 106 posted to the brand page 100 are communicated 110 to the user 104. In FIG. 1, stories 116, 117 associated with the content items 104, 106 are included in a news feed 116 sent to the user. As shown in FIG. 1, the news feed 116 includes additional stories describing actions taken by other social networking users connected to the user 104. Hence, the first content item 140 is included in the first news feed 132 in addition to additional stories 148, which may describe actions taken by other social networking users connected to the first user 122 However, the content items 104, 106 may be communicated 110 to the user 104 in a variety of ways. For example, the content items 104, 106, or descriptions of the content items, are included in one or more messages sent to the user 104.

The user 104 may interact with one or more of the content items 104, 106 included in the news feed 116, or otherwise communicated 110 to the user 102. For example, the user 104 may indicate a preference for a content item 106 (i.e., "like" the content item 106) by interacting with the story 117, may share a link for accessing the content item 106, may post a comment about the content item 106 by interacting with the store 117 or otherwise interact with the content item 106. Interactions between the user 102 and a content item 106 are communicated 120 to the brand page 100, or to the entity associated with the brand page 100, via a social networking system. For example, the type of interaction and a content identifier associated with the content item 106 with which the user interacted is communicated 120 back to the entity.

The entity associated with the brand page 104 uses the tag, or tags, associated with the content item 106 with which the user 102 interacted to select 124 additional content to send to the user 102. For example, the entity selects 124 additional content associated with one or more tags matching, related to or similar to, tags associated with the content with which the user interacted. In FIG. 1, the user 102 interacts with the content item 106 associated with tags 114A, 114B identifying "running" and "outdoor," and the entity associated with the brand page 104 selects 124 additional content associated with "running" and/or "outdoor" tags. In some embodiments, additional content associated with tags related to, or similar to, "running" and/or "outdoor" are selected 124.

The additional content selected by the entity based on the tags is provided 128 from the brand page 100 to the user 104. In FIG. 1, the additional content is provided 128 to the user as additional news feed stories 130, 132. For example, based on interaction with the content item 106 associated with tags 114A, 114B identifying "running" and "outdoor," a news feed story 130 about content associated with the "running" tag 114A and a news feed story 132 about content associated with the "outdoor" tag 114B are included in the news feed 116. In other embodiments, the additional content may be provided 128 to the user 100 via any suitable distribution channel, as described above. Hence, rather than provide the same content to each user connected to the brand page 100, content from the brand page 100 is provided 128 to a user based on the user's interaction with prior content from the brand page 100.

In one embodiment, groups of users may be generated by the social networking system based on the tag, or tags, associated with the content with which the user 104 interacted. A group of users may include users that interacted with content associated with a particular tag. For example, a group includes users interacting with the content item 104 associated with the "tennis" tag 112. This allows the entity associated with the brand page 100 to identify groups of users interacting with similar content, which may indicate a group of users having similar interests. In one embodiment, the type of interaction with a content item is also be used to form the groups. For example, a group of users who "liked" the content item 104 associated with the "tennis" tag 112 and a group of users who commented on the content item 104 associated with the "tennis" tag 112 are generated.

System Architecture

Figure 2:
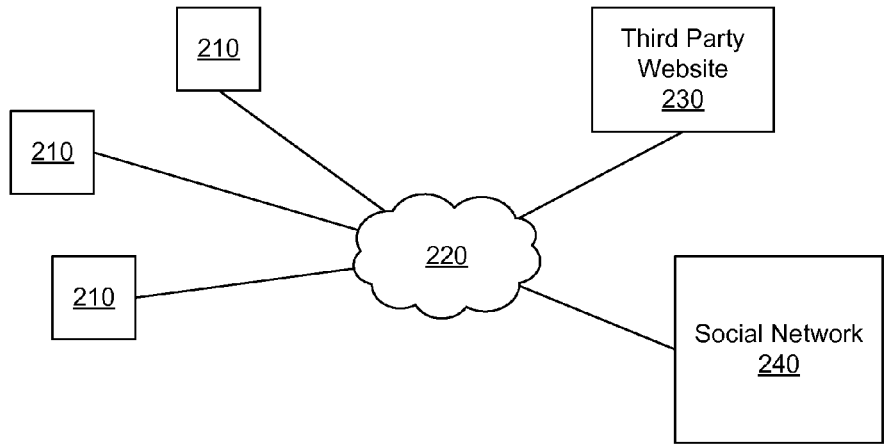
FIG. 2 is a block diagram of a system environment for providing content items to users of a social networking system, in accordance with an embodiment of the invention.

FIG. 2 is a high level block diagram illustrating a system environment 200 suitable for operation of a social networking system 240. The system environment 200 comprises one or more client devices 210, the social networking system 240, a network 220 and one or more third-party websites 230. In alternative configurations, different and/or additional components may be included in the system. The embodiments described herein can be adapted to online systems that are not social networking systems.

The client devices 210 comprise one or more computing devices capable of receiving user input as well as transmitting and/or receiving data via the network 220. For example, the client devices 210 may be desktop computers, laptop computers, smartphones, personal digital assistants (PDAs) or any other device including computing functionality and data communication capabilities. A client device 210 is configured to communicate via the network 220, which may comprise any combination of local area and/or wide area networks, using both wired and wireless communication systems. In one embodiment, a client device 210 executes an application allowing a user of the client device 210 to interact with the social networking system 240. For example, a client device 210 executes a browser application to enable interaction between the client device 210 and the social networking system 240 via the network 220. The third party website 230 may be coupled to the network 220 for communicating with the social networking system 240, which is further described below in conjunction with FIG. 3.

Figure 3:
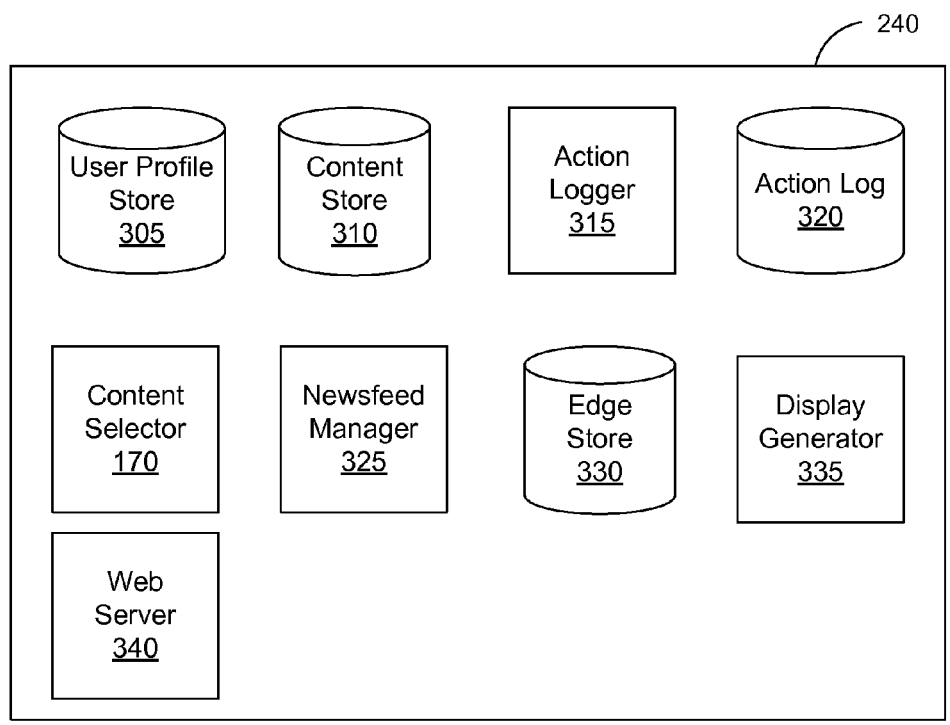
FIG. 3 is a block diagram of a social networking system, in accordance with an embodiment of the invention.

FIG. 3 is an example block diagram of a system architecture of the social networking system 240. The social networking system 240 includes a user profile store 305, a content store 310, an action logger 315, an action log 320, a content selector 170, a news feed manager 325, an edge store 330, a display generator 335, and a web server 340. In other embodiments, the social networking system 240 may include additional, fewer, or different modules for various applications. Conventional components such as network interfaces, security functions, load balancers, failover servers, management and network operations consoles, and the like are not shown so as to not obscure the details of the system architecture.

Each user of the social networking system 240 is associated with a user profile, which is stored in the user profile store 305. A user profile includes declarative information about the user that was explicitly shared by the user, and may also include profile information inferred by the social networking system 240. In one embodiment, a user profile includes multiple data fields, each data field describing one or more attributes of the corresponding user of the social networking system 240. The user profile information stored in user profile store 305 describes the users of the social networking system 240, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 240 displayed in an image. A user profile in the user profile store 305 may also maintain references to actions by the corresponding user performed on content items in the content store 310 and stored in the action log 320.

While user profiles in the user profile store 305 are frequently associated with individuals, allowing people to interact with each other via the social networking system 240, user profiles may also be stored for entities such as businesses or organizations. This allows an entity to establish a presence on the social networking system 240 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 310 stores content items associated with a user profile, such as images, videos and audio files. Content items from the content store 310 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social networking system 240 by displaying content related to users, objects, activities, or functionalities of the social networking system 240. Examples of social networking content items include suggested connections or suggestions to perform other actions, media provided to, or maintained by, the social networking system 200 (e.g., pictures or videos), status messages or links posted by users to the social networking system, events, groups, pages (e.g., representing an organization or commercial entity), and any other content provided by or accessible via the social networking system.

The content store 310 may also include one or more brand pages associated with user profiles of entities. A brand page comprises content associated with the entity and instructions for presentation of the content to a social networking system user. For example, a brand page identifies content associated with the entity's user profile as well as information describing formatting of content presented to users viewing the brand page.

The content store 310 also includes tags associated with content by an entity associated with a brand page. In one embodiment, one or more tags are included in content received from the entity. Alternatively, the tags are stored in the content store 310 and associated with content included in the content store 310. A tag may identify the subject matter described by a content item, a keyword associated with a content item, a user characteristic associated with a content item, a marketing campaign associated with a content item or any other suitable entity-defined criteria. For example, a sporting equipment supplier may associated a story describing a triathlon with tags identifying "swimming," "biking" and "running" In another example, the sporting equipment supplier may associate a post from a triathlon participant with tags identifying equipment used by the participant in the triathlon, such as "swimming goggles," "bicycle," "helmet," "sports drink" or other suitable tags. As described above, these tags can be used to identify users of the social networking system 240 that interact with the content, allowing groups of users interacting with similar content to be identified or presentation of additional content to a user based on prior interactions between the user and content.

The action logger 315 receives communications about user actions performed on and/or off the social networking system 240, populating the action log 320 with information about user actions. Such actions may include, for example, adding a connection to another user, sending a message to another user, uploading an image, reading a message from another user, viewing content associated with another user, attending an event posted by another user, among others. In some embodiments, the action logger 315 identifies interaction between a social networking system user and content posted to a brand page within the social networking system 240. In one embodiment, the action logger 315 communicates the content with which the social networking system user interacted and one or more tags associated with the content to the content selector 170, which selects additional content items for the social networking user based on the one or more tags. In addition, a number of actions described in connection with other objects are directed at particular users, so these actions are associated with those users as well. These actions are stored in the action log 320. These actions are stored in the action log 320.

The action log 320 may be used by the social networking system 240 to track user actions on the social networking system 240, as well as external website that communicate information to the social networking system 240. Users may interact with various objects on the social networking system 240, including commenting on posts, sharing links, and checking-in to physical locations via a mobile device, accessing content items or other interactions. Information describing these actions is stored in the action log 320. Additional examples of interactions with objects on the social networking system 240 included in the action log 320 include commenting on a photo album, communications between users, becoming a fan of a musician, adding an event to a calendar, joining a groups, becoming a fan of a brand page, creating an event, authorizing an application, using an application and engaging in a transaction. Additionally, the action log 320 records a user's interactions with advertisements on the social networking system 100 as well as other applications operating on the social networking system 240.

The action log 320 may also store user actions taken on external websites. For example, an e-commerce website that primarily sells sporting equipment at bargain prices may recognize a user of the social networking system 240 through social plug-ins that enable the e-commerce website to identify the user of the social networking system. Because users of the social networking system 240 are uniquely identifiable, e-commerce websites, such as this sporting equipment retailer, may use the information about these users as they visit their websites. The action log 320 records data about these users, including webpage viewing histories, advertisements that were engaged, purchases made, and other patterns from shopping and buying.

By associating tags with content, an entity may use the action log 320 to ascertain user interaction with content that the entity posts to an associated brand page. For example, associating a tag describing a product feature with content about the product, an entity may obtain information about reaction to the product feature based on user interactions with the content. Interaction with content associated with the product feature tag may allow the entity to infer user interest in the product feature. Similarly, an entity may associate content with a tag identifying a brand to obtain information about how users interact with content the entity considers relevant to the brand. In other embodiments, an entity may define tags based on any criteria relevant to the entity, allowing an entity-specific segmentation of user interactions to be obtained.

The content selector 170 selects content items from the content store 310 for presentation a user of the social networking system 240 based on one or more tags associated with content with which the user previously interacted. For example, the content selector 170 receives a tag and a content identifier from the action log when a user interacts with content; the content selector 170 identifies additional content associated with the tag, or with a similar tag, and retrieves the identified additional content from the content store 310 for presentation to the user. Hence, the content selector 170, it matches tags associated with content posted to the brand page with tags associated with content from the brand page with which a user previously interacted to customize additional content from the brand page presented to the user.

In one embodiment, the content selector 170 also generates a group, or segment, of users based on one or more tags associated with content with which users interact. For example, the content selector 170 receives a user identifier from the action logger 315 in addition to a tag and a content identifier and generates groups including users interacting with content associated with the same tag, with similar tags or with related tags. Because the tags are entity-defined, this allows an entity to supply criteria for grouping social networking system users. This allows the entity to develop a more detailed understanding of how users interact with content, which may allow the entity to provide additional content to different users that better reflects interests of the users. When this methodology is used iteratively across an entire platform of users or across an entire brand or product line, the entity may build lists of users based on their interaction with brands, products, services or with other criteria specified by the entity via tags.

Content selected by the content selector 170 may be displayed in a variety of formats. In one example, the appearance of a brand page is modified to visually distinguish the selected content from other content when viewed by a user. As another example, the selected content, or a description of the selected content, is included in a news feed story in a user's news feed. Alternatively, the selected content, or a description of the selected content, is sent to the user via one or more messages; however, any suitable distribution format may be used to present the selected content to a user.

The news feed manager 325 selectively provides content to users of a social networking system 240 and records the consumption of content by users. In one embodiment, the news feed manager 325 generates stories for a user describing actions taken by other members of the social networking system 240 to whom the user is connected. In one example, the news feed generated by the news feed manager 325 for a user includes comments made by other users to whom the user is connected. In another example, the news feed generated includes content posted to the social network system 240 by other social networking system users to whom the user is connected or other actions taken by other users to whom the user is connected. New news feed stories generated for a user by the news feed manager 325 may be ranked and stored by the social networking system 200. The news feed manager 325 may communicate with the client devices 210 through the network 220 to provide content to users of the social networking system 200.

In one embodiment, the news feed manager 325 may provide content through a social plug-in, such as an iFrame, to the third party website 230 to provide content posted on the social networking system 240 about an entity associated with the third party website. As an example, an entity creating a brand page on the social networking system 240 may desire to publish content items posted on the brand page's news feed in the social networking system to the third party website 230 via a social plug-in installed on the third party website 230. In particular, an entity may selectively provide content to a user based on the previous interaction of the user with tags associated with content shown on the network 220, or provide content to a distribution list of users developed by recording users that have interacted with content directed to a specific topic.

In one embodiment, the edge store 330 stores the information describing connections between users and other objects on the social networking system 200 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 240, such as expressing interest in a page on the social networking system, sharing a link with other social networking system users and commenting on posts made by other users of the social networking system. The edge store 330 stores edge objects that include information about the edge, such as affinity scores for objects, interests, and other users. Affinity scores may be computed by the social networking system 240 over time to approximate a user's affinity for an object, interest, and other users in the social networking system 200 based on the actions performed by the user. Multiple interactions between a user and a specific object may be stored in one edge object in the edge store 330, in one embodiment. In some embodiments, connections between users may be stored in the content store 310, or the content store may access the edge store 330 to determine connections between users.

The display generator 335 determines when a user of the social networking system 240 has requested that information be displayed and communicates with the content selector 170 to customize content from a brand page that is presented to a user. For example, a user may navigate to a brand page within the social networking system, and the display generator 335 modifies appearance of the brand page based on the content selector 170. In one embodiment, the display generator 335, retrieves content identified by the content selector 170 from the content store 310 and displays the retrieved content in order to provide the user with a page experience customized based on the user's previous interaction with tagged content. For example, content items displayed when a user views the brand page are modified to visually distinguish content items associated with a tag similar to a tag associated with content with which the user previously interacted from other content items. The display generator 335 may provide a webpage or some other suitable display format to present content to the user via a client device 210. The display generator 355 may notify the content item selector 170 when the display has been generated in response to a request from the user.

The web server 340 links the social networking system 240 via the network 220 to the one or more client devices 210, as well as to the one or more third party websites 230. The web server 340 serves web pages, as well as other web-related content, such as JAVA®, FLASH®, XML and so forth. The web server 340 may provide the functionality of receiving and routing messages between the social networking system 200 and the client device 210, for example, instant messages, queued messages (e.g., email), text and SMS (short message service) messages, or messages sent using any other suitable messaging technique. A user may send a request to the web server 340 to upload information, for example, images or videos that are stored in the content store 310. Additionally, the web server 340 may provide API functionality to send data directly to native client device operating systems, such as iOS®, ANDROID™, webOS® or RIM.

Process for Selecting Content

Figure 4:
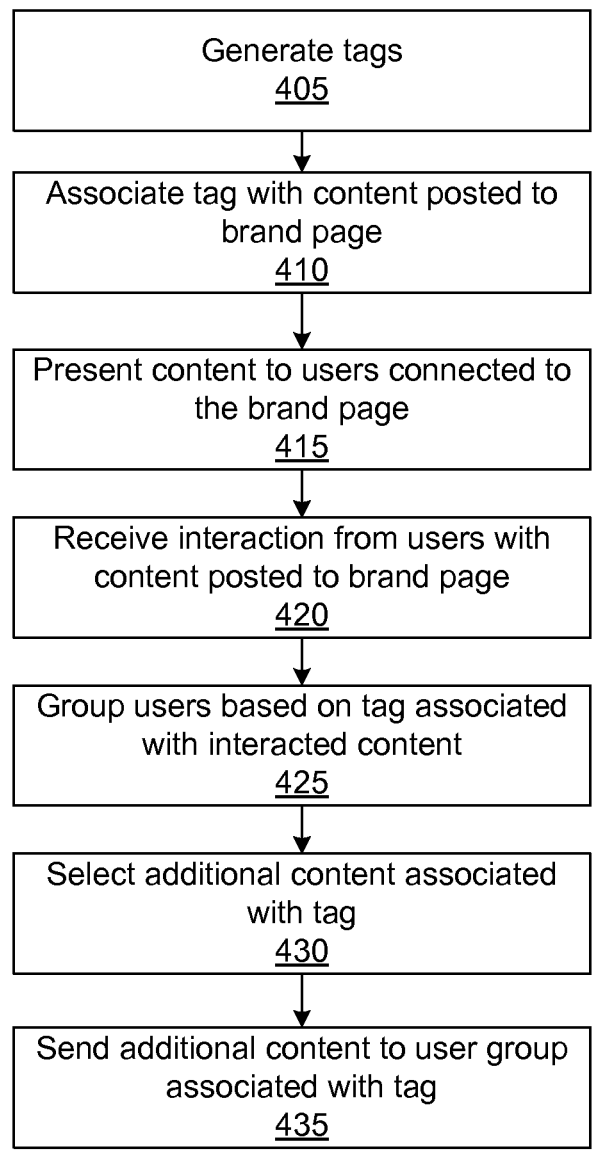
FIG. 4 is a flow chart of a process for providing content from a brand page to a social networking system user connected to the brand page, in accordance with an embodiment of the invention.

FIG. 4 illustrates a flow chart of a process 400 for providing content from a brand page to a social networking system user connected to the brand page, in accordance with an embodiment of the invention. An entity or another provider of content associated with the brand page generates tags 405, which are associated 410 with content posted on a brand page by the entity. In various embodiments, the tags may be defined by the entity associated with the brand page, allowing entity-specific tags to be associated with content, or the tags may be selected be selected from a group of predefined tags. Tags may identify the topic of the subject matter posted, a product featured or referenced in the content, a product feature of interest to the provider of content, a keyword describing the content or any other suitable entity-specific criteria. In various embodiments, the tags are associated 410 with content in different ways. For example, metadata couples the tag with content. Alternatively, the tag is included in the content or another suitable method for associating 410 a tag with content is used.

Content associated with one or more tags is presented 415 to social networking system users connected to the brand page. For example, content associated with a tag (also referred to as "tagged content") is presented 415 to a social networking system user viewing a brand page. In some embodiments, the presentation of the tagged content may be affected by other factors, such as the social networking system user's viewing history, demographic information, membership in a group or other data describing one or more characteristics of the social networking system user. Alternatively, the tagged content, or a description of the tagged content, is included on a story in a social networking system user's news feed or is sent to the social networking system user via a message.

In response to the social networking system user interacting with the tagged content, the social networking system receives 420 a description of the interaction between the user and an identifier of the content with which the social networking system user interacted. In one embodiment, the description includes a user identifier, a content identifier and the one or more tags associated with the content with which the social networking system interacted. The description may also include a type of interaction between the social networking system user and the content. For example, the description indicates whether the social networking system user shared the content with another user, indicated a preference for the content, shared a link to the content with another user or performed another type of interaction with the content.

Based, in part, on the tag associated with the content with which the user interacted, the user is grouped 425 with other users. In one embodiment, a group of users includes social networking system users that interacted with content associated with the same tag, associated with similar tags, associated with related tags or otherwise using tags associated with content with which the user interacted. In another embodiment, a group of users includes social networking users that performed a particular type of interaction with tagged content. For example, a group may include users who shared content tagged with a keyword of "running" while another group may include users who shred content tagged with the keyword of "running" A group of users may include a user identifier for the social networking users in the group as well as the tag associated with content with which the users in the group interacted. In yet other embodiments, one or more clustering algorithms are used to group the users.

Additional content associated with the tag is then selected 430 for the group of users associated with the tag and sent 435 to the client devices 210 of the users in the group. This allows the tags to be used for customizing additional content sent 435 to a user, or to a group of users, based on the tagged content with which the user, or group of users, previously interacted. For example, additional content for a group of users is selected so that the additional content is associated with a tag, or is similar to a tag, associated with content with which users in the groups previously interacted. Examples of additional content include advertisements, articles posted to the brand page, comments posted to the brand page, video posted to the brand page, links to other content posted on the brand page or any other suitable content associated with the brand page. The additional content may be presented to the user, or to a group of users, in a variety of ways. For example the selected additional content is visually distinguished from other content on a brand page viewed by a user in the group, is included in a news feed story sent to a user in the group, is included in a message sent to a user in the group or is sent 435 to a user in the group via any suitable communication protocol.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving content posted from an entity to a brand page stored in a social networking system, the entity associated with the brand page;
   receiving, from the entity associated with the brand page, one or more tags associated with the content posted to the brand page by the entity;
   presenting the content posted on the brand page to users of the social networking system to whom the brand page is connected;
   receiving interactions with the content posted on the brand page from a plurality of the users of the social networking system who are connected to the brand page;
   identifying, by the social networking system, a group of users, of the plurality of users, who performed the received interactions with the content associated with the one or more tags;
   selecting, by the social networking system, additional content for the group of users, the additional content selected based on the additional content having a tag matching the one or more tags associated with the content interacted with by the group of users of the social networking system; and
   sending, by the social networking system, the additional content in a story in a news feed to a client device associated with a viewing user included in the group of users.

2. The method of claim 1, wherein the additional content comprises an advertisement.

3. The method of claim 1, wherein the one or more tags are defined by the entity.

4. The method of claim 1, wherein the one or more tags are selected from a group of predetermined tags.

5. The method of claim 1, wherein interactions with the content comprises at least one of:
   sharing the content with another user, indicating a preference for the content or sharing a link to the content with another user.

6. The method of claim 1, wherein the group of users includes users who have performed a type of interaction with the content having the one or more tags.

7. The method of claim 6, wherein the type of interaction comprises at least one of:
   sharing the content with another user, indicating a preference for the content or sharing a link to the content with another user.

8. The method of claim 1, further comprising:
   identifying a second group of users, of the plurality of users, including users who have interacted with content associated with a second tag.

9. The method of claim 1, wherein the one or more tags identify an attribute of content, the attribute defined by the entity.

10. A method comprising:
    receiving, from an entity associated with a brand page, one or more tags associated with content posted to the brand page by the entity, the entity and the brand page stored in a social networking system;
    presenting the content posted on the brand page to users of the social networking system connected to the brand page;
    receiving interactions with the content posted on the brand page from a plurality of the users of the social networking system connected to the brand page;
    generating, by the social networking system, a group of users, of the plurality of the users, who performed the received interactions with the content associated with one or more tags;
    selecting, by the social networking system, additional content for the group of users, the additional content selected based on the additional content having a tag matching to the one or more tags associated with the content interacted with by the group of users of the social networking system; and sending, by the social networking system, the additional content in a story in a news feed to a client device associated with a viewing user included in the group of users.

11. The method of claim 10, wherein the additional content comprises an advertisement.

12. The method of claim 10, wherein the additional content selected by the entity is selected based on a type of interaction between content associated with the tag and users in the group of users.

13. The method of claim 10, wherein an interaction with the content posted on the brand page comprises at least one of:
sharing the content with another user, indicating a preference for the content or sharing a link to the content with another user.

14. The method of claim 10, wherein the group of users includes users who have interacted with content associated with the one or more tags and who have performed a type of interaction with the content having the one or more tags.

15. The method of claim 14, wherein the type of interaction comprises at least one of:
sharing the content with another user, indicating a preference for the content or sharing a link to the content with another user.

16. The method of claim 10, further comprising:
generating a second group of users to whom the brand page is connected, the second group of users including users who have interacted with content associated with a second tag.

17. The method of claim 10, wherein the one or more tags identify an attribute of content, the attribute defined by the entity.

18. A method comprising:
receiving from an entity associated with a brand page, one or more tags associated with content posted to the brand page by the entity, the entity and the brand page stored in a social networking system;
presenting the content posted on the brand page to users of the social networking system connected to the brand page;
receiving interactions with the content posted on the brand page from a user of the social networking system connected to the brand page;
determining one or more tags associated with the content posted on the brand page with which the user interacted;
selecting, by the social networking system, additional content for the user, the additional content selected based on the additional content having a tag matching to the one or more determined tags associated with the content interacted with by the user of the social networking system; and
sending, by the social networking system, the additional content in a story in a news feed to a client device associated the user.

19. The method of claim 18, wherein the additional content is associated with the tag based on a type of interaction between content associated with the tag and the user.

* * * * *